Patented Apr. 28, 1942

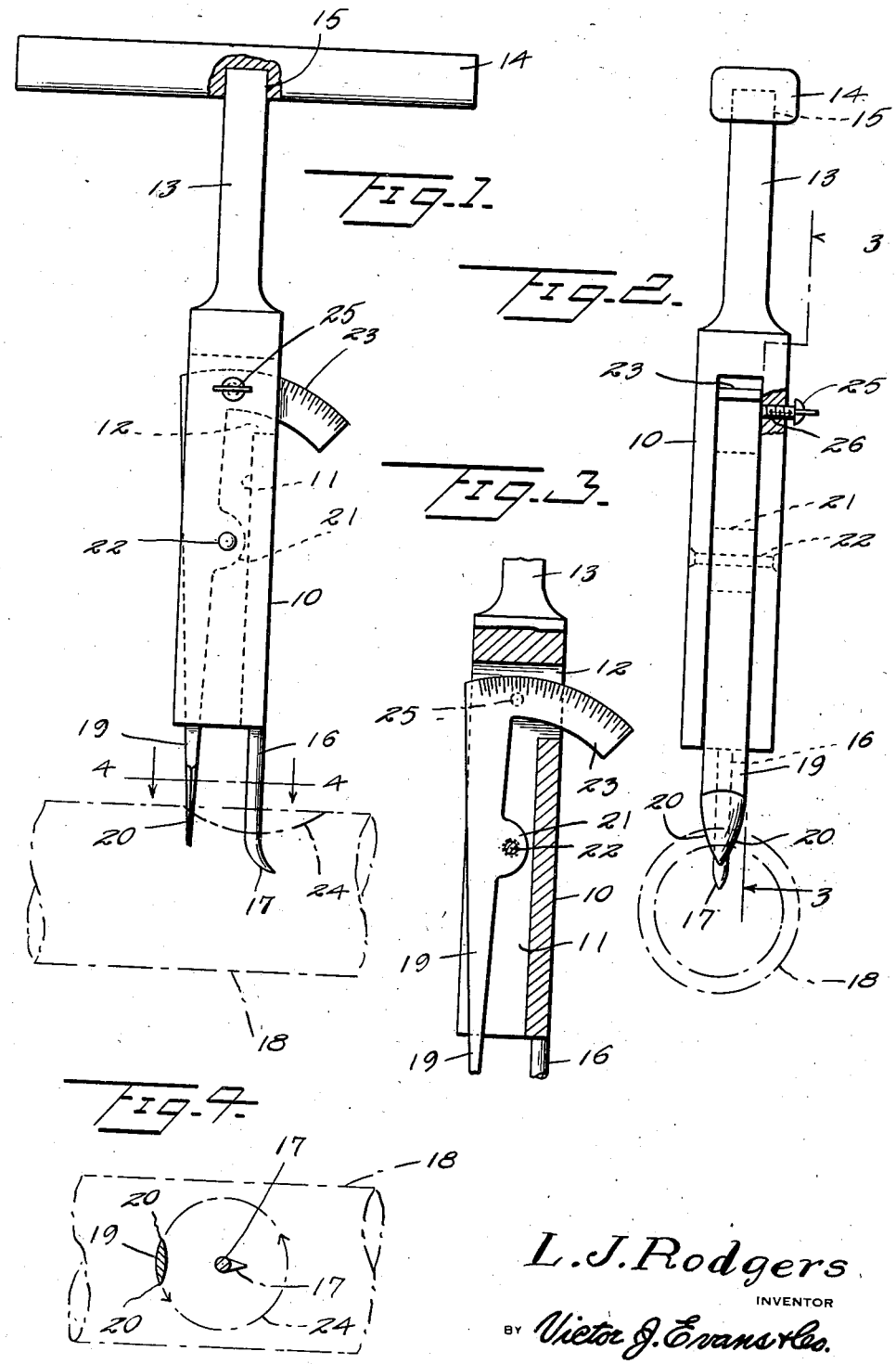

2,281,172

UNITED STATES PATENT OFFICE 2,281,172

TAPPING TOOL

Lawrence J. Rodgers, Vernon, Tex.

Application June 2, 1941, Serial No. 396,356

1 Claim. (Cl. 164—71)

This invention relates to tapping tools and has for an object to provide a tool adapted to cut a circular opening in a lead pipe where a branch pipe is to be connected by solder.

A further object is to provide a tool of this type having a shank provided with a curved end adapted to pull out the plug formed by cutting the circular opening.

A further object is to provide a tool of this character in which the cutter may be adjusted from one-half to two inches from the shank, which latter forms the axis of rotation of the tool, to cut circular openings of various sizes.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a front elevation of a tapping tool constructed in accordance with the invention.

Figure 2 is a side elevation of the tool shown in Figure 1.

Figure 3 is a detail longitudinal sectional view taken on the line 3—3 of Figure 2, showing the cutter in elevation.

Figure 4 is a detail cross sectional view taken on the line 4—4 of Figure 1 showing the shank and cutter in position to cut a circular opening in a pipe.

Referring now to the drawing in which like characters of reference designate similar parts in the various views, 10 designates a frame formed of a metal bar of substantially rectangular cross section having a recess 11 therein opening through one end edge, through the bottom, and having an extension 12 opening through the opposite end edge of the frame. The frame is provided with an extension 13 at the upper end which is equipped with a transversely disposed handle 14 which projects at both ends beyond the extension. The extension is substantially rectangular in cross section and is removably received in a similar shaped socket 15 formed in the handle intermediate the ends thereof.

A shank 16 is formed integral with the bottom of the frame near one end edge thereof. The shank is curved laterally at the bottom and sharpened to provide a penetrating point 17 adapted to be pushed through a pipe 18 at the center of the opening which is to be cut in the pipe.

A cutter 19 is formed of a bar of material which tapers from the upper end to the lower end, and at the lower end is sharpened to provide cutting edges 20, best shown in Figure 4. The cutter is provided intermediate its upper and lower ends with an eye 21 through which a pivot pin 22 is passed. The pivot pin may be in the form of a rivet, if desired, and pivotally mounts the cutter in the recess 11 to be swung at its lower cutting end toward and away from the shank 16.

The cutter is provided at the upper end with an arcuate metal scale 23, the center of curvature of which is at the pivot pin 22. The scale is graduated in the usual manner in inches and fractions thereof and moves through the extension 12 of the recess 11 when the cutter is rocked on the pivot pin 22 to a desired distance away from the shank 16, which distance is equal to the radius of the opening 24 to be cut in the pipe 18.

A set screw 25 is threadedly engaged through an opening 26 formed in one of the side faces of the frame and engages the scale 23 to rigidly secure the cutter in adjusted position.

In operation, the cutter is set with its lower end the desired distance from the shank 16 by use of the scale. Then the set screw is tightened to maintain the adjustment. The curved pointed end 17 of the shank 16 is then pushed through the pipe at the center of the opening 24 desired to be cut. When the pointed end has penetrated the pipe, the tool is rotated in either direction completely around the shank 16 as an axis of rotation in either direction, until a circular cut is made through the pipe. Then the tool may be withdrawn from the pipe and as the shank is curved at the lower end underneath the severed circular disk of material cut from the pipe, the disk will be lifted by the curved end of the shank and removed from the pipe as the tool is withdrawn.

From the above description it is thought that the construction and operation of the invention will be fully understood without further explanation.

What is claimed is:

A tapping tool comprising a frame in the nature of a bar, a transverse handle on the upper end of the bar for turning the bar axially, a shank extending downward from the bottom of the bar terminating in a curved sharpened lower end, there being a longitudinal recess in one side of the bar opening through the bottom of the bar and having a transverse extension at the upper end opening through the opposite side of the bar, a cutter in the nature of a bar pivoted centrally in said recess and extending downwardly along said shank, the cutter terminating in a sharpened lower end adapted to cut a circular disk from a pipe when the curved lower end of the shank is inserted in the pipe at the center of an opening to be cut by the cutter during rotation of the tool to carry the cutter in a circular path around the shank, an arcuate scale on the upper end of the cutter concentric with the pivot of the cutter and extending through said extension of the recess for indicating adjusted pivotal positions of the cutter with respect to the first named bar, and a set screw engaged through the first named bar and engaging the cutter to hold the cutter in adjusted positions.

LAWRENCE J. RODGERS.